United States Patent Office

3,528,922
Patented Sept. 15, 1970

3,528,922
NOVEL SURFACTANT COMBINATION IN A SOLVENT DEGREASING SELF-EMULSIFYING CLEANING COMPOSITION
Robert E. Wagner, Jr., Havre de Grace, Md., assignor to the United States of America as represented by the Secretary of the Army
No Drawing. Filed July 27, 1967, Ser. No. 656,998
Int. Cl. C11d 7/50, 9/24, 9/30
U.S. Cl. 252—118     5 Claims

ABSTRACT OF THE DISCLOSURE

An organic solvent cleaner in which a specific combination of ethanolamine soaps are an effective substitute for the previously employed surfactant (aromatic amine sulfonate) which was objectionable because of its nonbiodegradable nature. Within relatively narrow ranges of inclusion the ethanolamine soaps provide an equally effective cleaning composition for removing lithium, sodium and calcium base greases, tars, asphalt and preservative type compounds.

---

The invention described herein may be manufactured and used by or for the Government of the United States for governmental purposes without the payment to me of any royalty thereon.

This invention relates to further improvements in solvent degreasing self-emulsifying cleaners and more particularly to a cleaning composition containing (1) the condensation product of diethylene triamine and diacetone alcohol, (2) ethylene glycol monobutyl ether, (3) cyclohexanol, (4) diglycol oleate and (5) a novel surfactant combination with improved characteristics over previous ingredients used for this purpose.

The particularly useful condensation product of diethylene triamine and diacetone alcohol and its remarkable utility in a synergistic mixture with oleates is described in U.S. Pat. 2,616,856 issued Nov. 4, 1962 to Myer Rosenfeld and Charles F. Pickett.

Additive concentrates containing the aforementioned condensation product have been developed into the final solvent degreasing and self-emulsifying cleaners of utility at the Coating and Chemical Laboratory located at the Army's Aberdeen Proving Ground in Maryland. Cleaning compositions of this type as well as improved additive concentrates form the subject matter of U.S. Pat. 3,146,207 issued Aug. 25, 1964 to Myer Rosenfeld and to Robert E. Wagner, Jr., who is also the applicant herein. Solvent degreasing self-emulsifying cleaners of this type have found great utility in removing greases conforming to Military Specification MIL-G-10924 which meets the requirements of the Armed Forces in the lubrication of automotive and artillery equipment. The solvent cleaners are highly successful in removing the persistent greases identified as lithium and calcium hydroxystearate thickened oils as well as in the removal of tar, asphalt, aged preservative coatings and the sodium and calcium base greases conforming to Federal Specification VV-G-632.

One disadvantage of cleaners containing an additive concentrate in accordance with the Pat. 3,146,207 was due to the inclusion therein of a certain aromatic acyclic amine sulfonate which was found to be non-biodegradable and therefore cannot be readily consumed in waste waters and sewage effluents. The biodegradable resistance of molecules generically defined as alkyl benzene sulfonates has been known for some time and has been attributed to the presence of a highly branched alkyl chain. The particularly effective molecule employed in the cleaner is the dodecylbenzene amine sulfonate in which the dodecyl chain comprises a mixture of branched alkyls rendering the molecule extremely resistant to biological attack.

Another disadvantage with the aromatic acyclic amine sulfonate is due to its limited availability in view of the pressures for marketing more easily degradable surfactants.

The primary object of this invention is to provide an improved solvent degreasing and self-emulsifying cleaner of completely biodegradable nature which is capable of removing the more persistent type greases, tars, preservative compounds and the like. Another object of the invention is to provide an improved solvent action by a novel combination of ingredients which can be utilized in the manner of an aromatic acylic amine sulfonate in a solvent cleaning compound.

A further object of the invention is to provide a cleaning composition which incorporates readily available ingredients as replacements for specific proprietary surfactant compounds.

Other objects and advantages will become readily apparent as the invention is described in greater detail herein.

Briefly, the present invention is predicated upon the unexpected finidng that a specific combination of ethanolamine soaps may be utilized as an effective substitute for the aromatic acyclic amine sulfonate heretofore specified in a solvent cleaning composition. The ethanolamine soaps are more desirably employed in place of the prior art surfactant compound because they are completely biodegradable and therefore in conformity with the present trends to employ compounds which are readily consumed in waste waters and sewage effluents. Ethanolamine soaps also have favorable economics as compared with alkyl benzene sulfonates and in particular with the branched chain alkyl benzene amine sulfonate previously recommended as the surfactant molecule. In addition, the ethanolamine soap combination is very conveniently formed in situ in the practice of the present invention.

The present ethanolamine soap mixture consists essentially of ethanolamine laurate, palmitate and oleate which are found to be effective when utilized in specific weight percentages in the solvent composition. The ethanolamine laurate may be present in said composition in an amount in the range of from about 0.4 to about 3.3 grams per 100 milliliters solution; the ethanolamine palmitate may be present in an amount in the range of from about 0.4 to about 3 grams per 100 milliliters solution, and the ethanolamine oleate may be present in an amount in the range of from about 1.5 to about 4.6 grams per 100 milliliters solution. That the ethanolamine soap mixture is specific for performing the surfactant function of the aromatic acyclic amine sulfonate, as disclosed in Pat. 3,146,207, becomes readily apparent from test comparisons involving any one or mixtures of any two ethanolamine soaps. Ethanolamine laurate in concentrations of from 0.4 to 3.3 grams per 100 ml. solution in combination with ethanolamine oleate from 1.5 to 4.6 grams per 100 ml. solution was found to be ineffective in replacing the aromatic acyclic amine sulfonate. Similarly, ethanolamine palmitate in concentrations from 0.4 to 3 grams per 100 ml. solution in combination with ethanolamine oleate from 1.5 to 4.6 grams per 100 ml. solution was ineffective for the object of replacing the aromatic acyclic amine sulfonate.

It has been found more convenient in the practice of the present invention to prepare the ethanolamine soaps by adding the acids, lauric, palmitic, and oleic to the solvent composition containing ethanolamine. A slight excess of the acids may be employed in forming the soap mixture without any noticeable limitation on the performance of the instant cleaner. The total acids used in the reaction may exceed the ethanolamine content by a maximum of 5.3%. Conversely, the ethanolamine content may exceed the total acids employed in the reaction by a maximum of 2.4%. It is of particular advantage that a certain amount of unreacted ethanolamine or acid may be present in the final cleaning composition, since commercial grade acids vary considerably in analysis and may include other acidic materials in various amounts. The presence of other acids in relatively small amounts is not considered objectionable but it is more desirable to include ethanolamine for the purpose of neutralizing such acidic materials into ethanolamine soaps for improved emulsifiability.

Lauric acid is employed in concentrations from 0.3 to 2.5 grams per 100 milliliters solvent solution; oleic acid is employed in concentrations from 1.4 to 4.0 grams per 100 milliliters solvent solution, and palmitic acid is employed in concentrations from 0.3 to 2.6 grams per 100 milliliters solvent solution.

Illustrative of the solvent cleaning composition which may be prepared in accordance with the invention includes the following additive concentrate in parts by volume:

ADDITIVE CONCENTRATE

| | |
|---|---|
| Cyclohexanol | 1.00 |
| Ethylene glycol monobutyl ether | 0.50 |
| Diethylene triamine-diacetone condensate | 0.25 |
| Diglycol oleate | 1.00 |
| Total parts by volume | 2.75 |

The additive concentrate of 2.75 parts by volume is added to 100 parts by volume of a suitable solvent, for example, 70 parts coal tar high flash naphtha and 30 parts kerosene, or 100 parts by volume of a petroleum solvent having an aromatic content of at least 70% by weight (e.g. Solvesso 100, Panasol ANI).

In the following examples, lauric acid, oleic acid, palmitic acid and ethanolamine are given in grams per 100 milliliters of the above additive concentrate and solvent mixture. Polished steel panels coated with 5 milligrams of grease were aged for 2¼ hours in an oven at 88° C. The panels were then allowed to cool in a desiccator over water. In the testing operation, the panels were suspended in containers having equal amount of various cleaning compositions. After 30 minutes the panels were removed from the compositions, dipped gently in petroleum ether and allowed to drain while leaning at approximately 60° angle. The panels were then examined for residual soap, oil or greease.

ing all greases when employed in excess of the effective range, as shown by Example 10, the cleaning composition is unsatisfactory in emulsification.

Other oleates may be present in the additive concentrate in addition to the present mixture as disclosed herein. For example, ethanolamine oleate may be present in the additive concentrate in an amount as high as 4 parts by volume, as disclosed in Pat. 3,146,207, the preferred concentration now being between 3–3.5 parts by volume. The ethanolamine oleate which included in the concentrate may be more conveniently prepared in a certain amount of solvent and the prepared soap is then added to the concentrate:

| | Parts |
|---|---|
| Solvent (a coal tar or petroleum high flash naphtha) | 50 |
| Ethanolamine | 7.7 |
| Oleic acid | 42.3 |

The ingredients are combined in the order listed. This convenient solution is then measured in parts by volume, allowances being made for the solvent ingredient included therein.

While this invention has been fully described, it will be understood that this disclosure is for purposes of exemplification and is not to be taken by way of limitation, the spirit and scope of the invention being limited only by the terms of the accompanying claims.

What is claimed and desired to be secured by Letters Patent of the United States is:

1. A solvent degreasing self-emulsifying cleaning composition consisting essentially of (A) an additive concentrate, (B) an organic solvent and (C) a mixture of ethanolamine soaps:

said (A) additive concentrate consisting essentially of the following ingredients in parts by volume:

| | |
|---|---|
| Cyclohexanol | 1.00 |
| Ethyleneglycol monobutyl ether | 0.50 |
| Diethylene triamine-diacetone condensate | 0.25 |
| Diglycol oleate | 1.00 | said (B) organic solvent being selected from the group of solvents consisting of:
70 parts by volume of coal tar high flash naphtha and 30 parts by volume of kerosene; and
100 parts by volume of a petroleum distillate having an aromatic content of at least 70 percent by weight;

said (A) and (B) forming a solution mixture, and a mixture of ethanolamine soaps consisting essentially of:

| | Examples | | | | | | | | | | | |
|---|---|---|---|---|---|---|---|---|---|---|---|---|
| Ingredients | 1 | 2 | 3 | 4 | 5 | 6 | 7 | 8 | 9 | 10 | 11 | 12 |
| Lauic acid | 0.47 | 0.41 | 0.45 | 0.40 | 0.40 | 0.46 | 0.47 | 0.47 | 0.47 | 0.58 | 0.33 | 0.41 |
| Oleic acid | 2.49 | 2.06 | 2.03 | 1.88 | 1.88 | 2.57 | 2.95 | 3.04 | 2.80 | 2.80 | 2.80 | 2.08 |
| Palmitic acid | 0.31 | 0.27 | 0.27 | 0.24 | 0.26 | 0.31 | 0.34 | 0.34 | 0.43 | 0.33 | 0.33 | 0.27 |
| Ethanolamine | 0.73 | 0.66 | 0.66 | 0.58 | 0.58 | 0.72 | 0.86 | 0.86 | 0.73 | 0.85 | 0.77 | 1.32 |
| | Percentage of grease removed | | | | | | | | | | | |
| Tests performed: | | | | | | | | | | | | |
| Sodium base grease VV-G-632 | 100 | 100 | 100. | 100 | 100 | 100 | 100 | 80 | 100 | 100 | 100 | 90 |
| Calcium base grease VV-G-632 | 100 | 100 | 100 | 100 | 100 | 100 | 100 | 50 | 100 | 100 | 100 | 70 |
| Lithium base grease MIL-G-10924 | 100 | 100 | 100 | 100 | 100 | 100 | 98 | 53 | 85 | 100 | 85 | 85 |
| Emulsifiability | | | Satisfactory | | | | | | | (¹) | | |

¹ Unsatisfactory.

Examples 1–7 illustrate the effective compositions containing the novel ssurfactant combination of ethanolamine soaps in place of the previous aromatic acyclic amine sulfonate. In Example 2 the amine content exceeds the total acid content by 2.4%; in Example 6 the total acid content by 5.3%. In Example 8 the amount of oleic acid employed exceeds the maximum effective limit and is therefore unsatisfactory for removing sodium, calcium and lithium base greases. Also when the palmitic acid exceeds the effective range, as is Example 9, the composition is unsatisfactory in the removal of lithium base grease. Although lauric acid is effective for removethanolamine laurate in an amount in the range of from about 0.4 to about 3.3 grams per 100 milliliters of said solution mixture;

ethanolamine palmitate in an amount in the range of from about 0.4 to about 3 grams per 100 milliliters of said solution mixture; and ethanolamine oleate in an amount in the range of from about 1.5 to about 4.6 grams per 100 milliliters of said solution mixture.

2. A solvent degreasing self-emulsifying cleaning composition as in claim 1 in which said additive concentrate includes therein up to 4 parts by volume of ethanolamine oleate.

3. The method of forming a solvent degreasing self-emulsifying cleaning composition comprising:
adding lauric, palmitic and oleic acids to a solution mixture consisting essentially of the following ingredients in parts by volume:

| | |
|---|---|
| Cyclohexanol | 1.00 |
| Ethyleneglycol monobutyl ether | 0.50 |
| Diethylene triamine-diacetone condensate | 0.25 |
| Diglycol oleate | 1.00 |
| High flash coal tar naphtha | 70.00 |
| Kerosene | 30.00 | and containing ethanolamine therein sufficient to convert said acids to ethanolamine soaps;
said acids consisting essentially of about 0.3 to 2.5 grams lauric acid per milliliters of solution mixture, about 0.3 to 2.6 grams palmitic acid per 100 milliliters of solution mixture and about 1.4 to 4.0 grams oleic acid per 100 milliliters of solution mixture.

4. The method in accordance with claim 3 in which said ethanolamine equivalent exceeds the total acid equivalent by a maximum of 2.4 percent.

5. The method in accordance with claim 4 in which the total acid equivalent exceeds said ethanolamine equivalent by a maximum of 5.3 percent.

References Cited

UNITED STATES PATENTS

| | | | |
|---|---|---|---|
| 3,146,207 | 8/1964 | Rosenfeld et al. | 252—118 |
| 2,929,789 | 3/1960 | Pickett et al. | 252—153 |
| 2,901,433 | 8/1959 | Spring | 252—118 |
| 2,700,654 | 1/1955 | Holman | 252—118 |

LEON D. ROSDOL, Primary Examiner

D. L. ALBRECHT, Assistant Examiner

U.S. Cl. X.R.

252—111, 114, 171